Jan. 22, 1957  R. L. ANDERSON  2,778,960
SPECIALLY COUPLED MOTOR-GENERATOR APPARATUS
Filed April 29, 1954
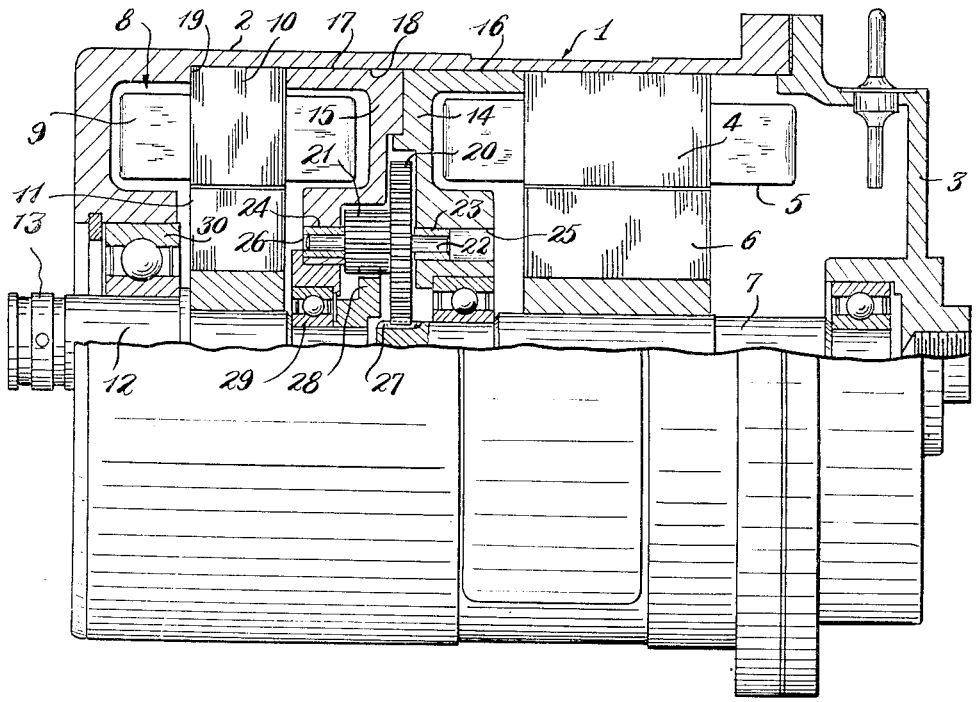
INVENTOR.
ROBERT L. ANDERSON
BY
Oldham & Oldham
ATTORNEYS

United States Patent Office

2,778,960
Patented Jan. 22, 1957

2,778,960

SPECIALLY COUPLED MOTOR-GENERATOR APPARATUS

Robert L. Anderson, Rocky River, Ohio, assignor to The Hertner Electric Company, Cleveland, Ohio, a corporation of Ohio Application April 29, 1954, Serial No. 426,331

6 Claims. (Cl. 310—113)

This invention relates to motor-generator apparatus, and especially to a generator having an output shaft available thereon so that mechanical drive can be taken from the generator with such mechanical drive being in exact synchronism with electrical impulses created in the generator. The motor-generator apparatus of the invention also is particularly adapted to have the generator driven at a different number of revolutions per minute than the drive motor. The motor-gear system-generator of the invention are formed into an integral unit in a novel housing and assembly provided by this invention.

Heretofore, insofar as I am aware, there has been no provision of a compact motor-generator unit wherein the generator is driven at a different speed from the motor speed, nor has any such motor-generator set previously provided a mechanical output shaft for the generator so that such shaft is driven to provide mechanical output in synchronism with generated electrical impulses or power output.

Normally when any type of gear-reduction means are provided, there is some backlash or other play in the speed reducing unit so that if a driven output were provided in combination with a generator, and the generator output speed has to be reduced for use thereof, such reduced speed output could easily be out of phase slightly with electrical signals created in the generator. It also has been common practice to use motors in motor-generator sets which motors have power only sufficient to drive the generator to generate the rated electrical power therein.

It is the general object of the present invention to provide an improved type of motor-generator apparatus characterized by the synchronism of a mechanical output shaft drive provided from the generator with electrical impulses created or generated in the generator.

Another object of the invention is to provide a motor-generator unit wherein the generator can be driven at greater or less speed than the rotational speed of the motor.

A further object of the invention is to provide a motor-generator unit wherein the drive motor is of larger power capacity than is required for only driving the generator coupled to such motor so that mechanical drive energy can be taken from the generator drive shaft.

A further object of the invention is to provide a compact motor-generator unit wherein the motor, and generator, and the gear reduction connection means are housed in a unitary housing member and with such gear reduction means connecting the motor to the generator.

Another object of the invention is to use a separator member in a motor-generator unit between independent shafts provided for the motor and the generator and to couple such shafts by speed change means positioned by such separator member.

The foregoing and other objects and advantages of the present invention will be made more apparent as the specification proceeds.

For a better understanding of the present invention, reference should be had to the accompanying drawing which show one currently preferred embodiment of the principles of the invention and with a portion of the motor-generator apparatus being broken away and shown in vertical section to clarify the disclosure of such apparatus.

When referring to corresponding parts in the following specification and the accompanying drawings, corresponding numerals will be used to facilitate comparison between the drawings and the specification.

The motor-generator apparatus of the invention includes a housing member, an electric motor means having a shaft and received in said housing, an electric generator means having a shaft extending from said housing for supply of output mechanical driven energy therefrom and with such electric generator means being received in said housing, and speed change means journalled in the housing and connecting the shafts of the motor and generator so that a mechanical output shaft is provided driven in exact synchronism with electrical impulses created in the generator means.

The single figure of the drawings is a side elevation of the apparatus of the invention, partly shown in section on an axial plane of such apparatus.

For a complete understanding of the apparatus of the invention, attention now is directed to the details of the structure shown in the drawings and a motor-generator unit is indicated as a whole by the numeral 1. The motor-generator unit 1 includes a shell or housing 2. This housing 2 has one open end over which a suitable end cap or yoke 3 is removably secured in accordance with conventional practice. An A. C. motor stator unit of conventional construction is received within the housing 2 and such stator unit normally comprises a plurality of metal laminations 4 which receive stator coils 5 therein, and a motor rotor unit 6 is provided in immediate radial association with the stator unit for the motor. A shaft 7 is provided for positioning the motor rotor unit 6, as hereinafter described.

Suitable generator or alternator means are provided in association with the motor unit of the invention and these means may include an alternator stator unit 8 which includes a plurality of alternator generator coils 9 which are received in suitable recesses (not shown) provided in a stack of super-imposed metal laminations 10, similar to the laminated unit 4 in the motor. A generator rotor 11 is likewise positioned in immediately adjacent radial association to the generator stator unit 8 and is positioned by a shaft 12. It should be noted that the shaft 12 has an end portion 13 which protrudes from the housing 2 for a reason to be described hereinafter in more detail and with such end portion 13 being adapted to have special means provided thereon for mechanically securing the shaft end to another member for driving such other member, if desired.

As one important feature of the present invention, a pair of disc members 14 and 15 having peripheral flanges 16 and 17 thereon, respectively, are positioned in snug telescopic engagement with a bore 18 of the housing 2. These flanges 16 and 17 are adapted to bear upon the motor stator laminations 4 and the laminations 10 of the generator and secure them tightly against each other in a fixed position within the housing 2, as indicated in the drawings. The disc members 14 and 15, or the flanges 16 and 17 thereof may be secured together, for example by screw means (not shown). A shoulder 19 is provided in the bore 18 and the laminations 10 are pressed against such shoulder 19 by the disc members 15 and 14. The stack of laminations 4 are secured against the flange 16 by suitable positioning means (not shown) adjacent the open end of the housing 2.

So that the generator 9 has its actual mechanical power load output shaft 12 driven in exact synchronism with electrical impulses created in such generator, and to drive such a generator at a desired output R. P. M. speed, an important feature of the invention resides in a positive speed change coupling means used for connecting the rotor shaft 7 with the shaft 12. These speed change means in the preferred embodiment of the invention shown herein include a relatively large diameter gear 20 and a small diameter gear 21 that are carried by a stub shaft 22. This shaft 22 preferably is journaled in bearings 23 and 24 that are received, respectively, in holes 25 and 26, respectively, provided in the disc members 14 and 15. The apparatus of the invention is so constructed and arranged that the large diameter gear 20 engages a gear 27 cut or otherwise formed on or otherwise in operative association with the shaft 7 to be driven thereby. The gear 21 is in positive engagement with another gear 28 usually suitably secured to the inner end of the shaft 12 for the generator. Hence any desired revolution speed change can be produced between the rotational speed of the driving shaft 7 and that of the output shaft 12 for the motor generator unit of the invention by the initial design of the gears 20, 21, 27 and 28 or other speed change means provided. It will be realized that a plurality of gear stages may be used to couple the shafts 7 and 12 to furnish any desired speed change coupling, and that other conventional speed change means, such as a planetary gear reduction system may be used to connect shafts 7 and 12.

As a further important advantage of the construction of the invention, it will be seen that even though the gear means connecting the shaft 7 and 12 have backlash or slack therein, still the output shaft 12 will be driven in exact synchronism with the electrical impulses produced in the generator 9. This effectively correlates the mechanical and electrical outputs of the apparatus.

Suitable bearings 29 are carried by the disc members 14 and 15 to journal one end of each of the shafts 7 and 12 therein, and other bearings 30 position the opposite ends of such shafts.

The motor of the motor-generator unit 1 is reversible and the apparatus of the invention will provide an output shaft 13 driven in synchronism with the electric impulses of the generator at all times when the generator is driven in either direction and during the reversing operation.

The motor-generator unit 1 is compact and is desirable for use in any instance where a generator is desired to be driven at a different speed from the generator drive motor. The speed change means of the unit are compact and have multiple functions so that an uncomplicated, inexpensive construction having very desirable properties has been provided.

While one embodiment of the invention has been disclosed herein, it will be appreciated that modification of this particular embodiment of the invention may be resorted to without departing from the scope of the invention as defined in the appended claims.

What I claim is:

1. A motor-generator apparatus comprising a housing shell, motor stator means secured in said shell, motor rotor means, a generator stator means positioned in said shell, a generator rotor means, positioning disc means received in and positioned by said shell intermediate said motor stator means and generator stator means, individual shafts for said motor rotor means and said generator rotor means, speed change gear means positioned by said disc means, gears secured to said shafts and engaging said gear means to couple said shafts together, and bearing means positioned by said shell and disc means journalling said shafts in said shell.

2. A motor-generator apparatus comprising a housing shell, motor stator means secured in said shell, motor rotor means, a generator stator means positioned in said shell, a generator rotor means, a pair of positioning disc members snugly received in and extending across said shell intermediate said motor stator means and generator stator means, individual shafts for said motor rotor means and said generator rotor means, speed change gear means journalled on said disc members, gears carried by said individual shafts engaging said gear means to couple said shafts together, and bearing means carried by said shell and disc members journalling said shafts to permit rotation of said generator rotor means at a different speed than said motor rotor means.

3. A motor-generator apparatus comprising a shell, motor stator means secured in said shell, motor rotor means journalled within said shell, alternator stator means positioned in said shell, alternator rotor means journalled within said shell, a pair of positioning disc members snugly received in said shell intermediate said motor stator means and alternator stator means, said disc member being abutted against each other, individual shafts for said motor rotor means and said alternator rotor means positioned by said shell and different ones of said disc members, and speed change gear means journalled in said disc members, said shafts having gears thereon engaging said gear means to be coupled together thereby.

4. A motor-generator apparatus comprising a shell, a motor stator coil and lamination unit secured in said shell, a motor rotor journalled within said shell, an alternator stator coil and lamination unit positioned in said shell, a pair of positioning disc members abutted against each other and snugly received in said shell intermediate said motor stator unit and alternator stator unit and aiding in positioning said units in said shell, said disc members having cylindrical edge flanges, an alternator rotor journalled in said shell, individual shafts for said motor rotor and said alternator rotor, and speed change gear means journalled in said disc members and operatively connecting said shafts.

5. A motor-generator set comprising a cylindrical housing having an open end, electric motor means having a shaft received in said housing, electric generator means having a shaft extending from said housing for supply of output mechanical drive energy therefrom received in said housing, a separator member in and extending across said housing intermediate said motor means and generator means, one end of each of said shafts being journalled in said separator member, and speed change gear means at least partially positioned by said separator member and positively connecting said shafts of said motor and generator whereby an output shaft is provided driven in synchronism with electric impulses generated in said generator.

6. Apparatus as in claim 4 wherein said disc member flanges extend from the members in opposite directions and snugly engaging the bore of said shell, one of said flanges bearing on said motor stator coil and lamination unit and the other of said flanges bearing on said alternator stator coil and lamination unit to aid in positioning such units.

References Cited in the file of this patent
UNITED STATES PATENTS

| 1,157,533 | Harris | Oct. 19, 1915 |
| 1,375,319 | Rae | Apr. 19, 1921 |

FOREIGN PATENTS

| 918,829 | France | Nov. 4, 1946 |